US012687427B2

(12) United States Patent
Huang et al.

(10) Patent No.: US 12,687,427 B2
(45) Date of Patent: Jul. 21, 2026

(54) OPTICAL LENS ASSEMBLY AND OPTICAL MEASUREMENT METHOD

(71) Applicant: CHROMA ATE INC., Taoyuan City (TW)

(72) Inventors: Kuo-Wei Huang, Taoyuan City (TW); Hung-Ta Kao, Taoyuan City (TW); Po-Chen Kang, Taoyuan City (TW); Szu-Yuan Weng, Taoyuan City (TW); Yu-Yen Wang, Taoyuan City (TW)

(73) Assignee: Chroma ATE Inc., Taoyuan City (TW)

( * ) Notice: Subject to any disclaimer, the term of this patent is extended or adjusted under 35 U.S.C. 154(b) by 772 days.

(21) Appl. No.: 17/959,443

(22) Filed: Oct. 4, 2022

(65) Prior Publication Data

US 2023/0124939 A1 Apr. 20, 2023

(30) Foreign Application Priority Data

Oct. 19, 2021 (TW) .................................. 110138667

(51) Int. Cl.
*G01J 1/02* (2006.01)
*G02B 7/02* (2021.01)

(52) U.S. Cl.
CPC ............ *G01J 1/0252* (2013.01); *G02B 7/022* (2013.01); *G02B 7/028* (2013.01)

(58) Field of Classification Search
CPC ..................................................... G01J 1/0252
See application file for complete search history.

(56) References Cited

U.S. PATENT DOCUMENTS

| | | | |
|---|---|---|---|
| 5,764,409 A | 6/1998 | Colvin | |
| 6,980,360 B2 * | 12/2005 | Ue ..................... | G02B 21/0088 |
| | | | 359/554 |
| 2017/0285315 A1 | 10/2017 | Amano et al. | |
| 2021/0181120 A1 * | 6/2021 | Wu ........................ | G01J 1/0271 |

(Continued)

FOREIGN PATENT DOCUMENTS

| | | |
|---|---|---|
| JP | 2000510606 | 8/2000 |
| JP | 2005-345718 A | 12/2005 |
| JP | 3171985 | 11/2011 |

(Continued)

OTHER PUBLICATIONS

Taiwanese Search Report appended to a Taiwanese Office Action in Application No. 110138667, dated Dec. 13, 2022, 2 pages (with English translation).

(Continued)

*Primary Examiner* — Edmond C Lau
(74) *Attorney, Agent, or Firm* — Fish & Richardson P.C.

(57) ABSTRACT

An optical lens assembly is adapted for receiving a light beam that is emitted by an object, and includes a lens unit and a sleeve unit. The lens unit includes a casing that has a light-incident side adapted for receiving the light beam. The sleeve unit surrounds the light-incident side of the casing, and defines a light-receiving space that is adapted for the light beam to pass through so that propagation of the light beam is unaffected by disturbance caused by movement of air. An optical measurement method includes steps of: a) providing a lens unit, a sleeve unit, and an object that is for emitting a light beam; and b) operating the lens unit so that the light beam is received by the lens unit.

7 Claims, 7 Drawing Sheets

(56)                    References Cited

U.S. PATENT DOCUMENTS

2022/0043354 A1 *   2/2022   Lauermann ............ G02B 21/16

FOREIGN PATENT DOCUMENTS

| | | |
|---|---|---|
| JP | 2012-168492  A | 9/2012 |
| JP | 2017181659 | 10/2017 |
| TW | M560036 | 5/2018 |
| WO | WO 2007136075  A1 | 11/2007 |

OTHER PUBLICATIONS

Search Report in Chinese Appin. No. 202111214109.1, mailed on Dec. 16, 2025, 5 pages (with English 1 translation).
Search Report in Japanese Appln. No. 2022166607, mailed on Oct. 17, 2023, 48 pages (with English translation).

* cited by examiner

OPTICAL LENS ASSEMBLY AND OPTICAL MEASUREMENT METHOD

CROSS-REFERENCE TO RELATED APPLICATION

This application claims priority to Taiwanese Invention Patent Application No. 110138667, filed on Oct. 19, 2021.

FIELD

The disclosure relates to an optical measurement apparatus, and more particularly to an optical lens assembly and an optical measurement method.

BACKGROUND

Referring to FIG. 1, a conventional optical measurement apparatus 1 is adapted for measuring the optical characteristics of a light beam that is emitted by an object 11, and includes a platform 12, a probe card 13 and an objective lens 14. The object 11 is disposed on the platform 12. The probe card 13 is electrically coupled to the object 11. The objective lens 14 receives the light beam that is emitted by the object 11. A user may operate the platform 12 to adjust the ambient temperature for the object 11, electrically couple the probe card 13 with the object 11 to make the object 11 emit the light beam, and operate the object lens 14 so that a camera (not shown) can capture an image or the light beam when the objective lens 14 receives the light beam. After analyzing the image, the user can then obtain information regarding the optical characteristics of the light beam emitted by the object 11.

However, when the object 11 is subjected to certain tests (e.g., a temperature cycling test, a thermal shock test, and a temperature storage test) for the purpose of measuring Lite optical characteristics of the light beam emitted by the object 11, the temperature of the platform 12 will be different from that of the objective lens 14. At this time, the temperature difference causes a density differential within the air between the platform 12 and the objective lens 14, which generates convection currents in the air and causes the refractive index of the air to fluctuate. When the light beam emitted by the object 11 passes through the air that has a fluctuating refractive index, the optical path thereof will be constantly changing, which will then lead to an aero-optical effect (e.g., the image captured by the camera may be distorted or blurry), and result in poor measurement accuracy and repeatability.

SUMMARY

Therefore, an object of the disclosure is to provide an optical lens assembly that can alleviate at least one of the drawbacks of the prior art.

According to the disclosure, the optical lens assembly is adapted for receiving a light beam that is emitted by an object, and includes a lens unit and a sleeve unit. The lens unit includes a casing that has a light-incident side adapted for receiving the light beam. The sleeve unit surrounds the light incident side of the casing, and defines a light-receiving space that is adapted for the light beam to pass through so that propagation of the light beam is unaffected by disturbance caused by movement of Another object of the disclosure is to provide an optical measurement method that can alleviate at least one of the drawbacks of the prior art.

According to the disclosure, the optical measurement method includes steps of: a) providing an object that is for emitting a light beam, a lens unit that includes a casing, and a sleeve unit that surrounds the casing and that defines a light-receiving space; and b) operating the lens unit so that the light beam emitted by the object passes through the light-receiving space first and is then received by the lens unit. The light receiving space protects propagation of the light beam therein against disturbance caused by movement of air.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
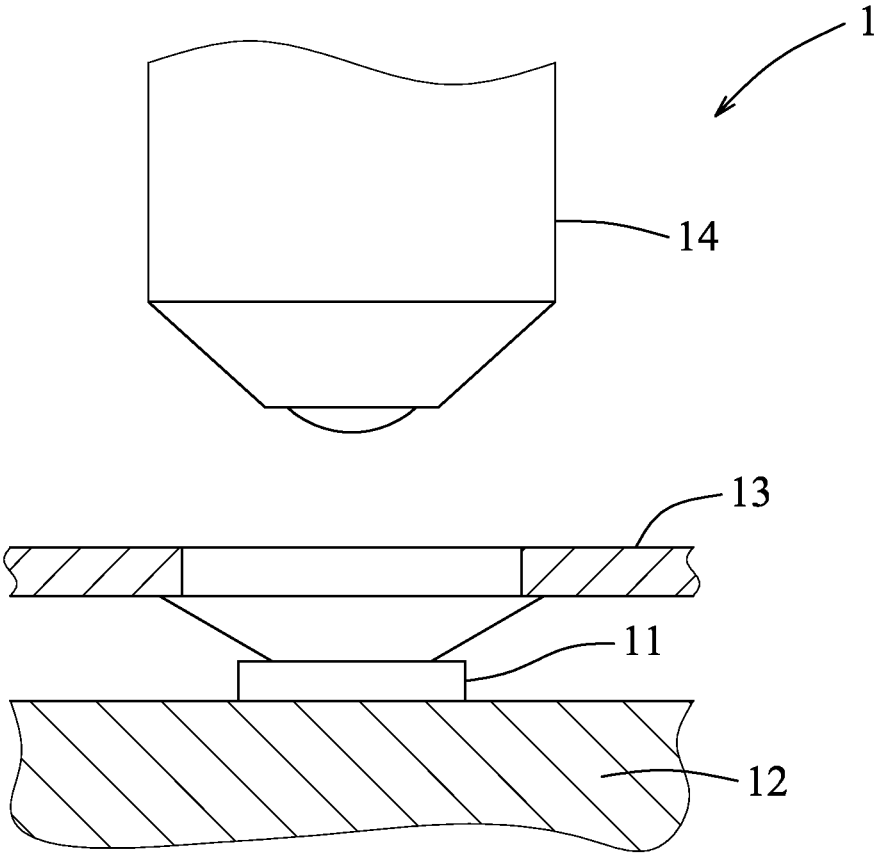
FIG. 1 is a fragmentary sectional view of a conventional optical measurement apparatus.
Figure 2:
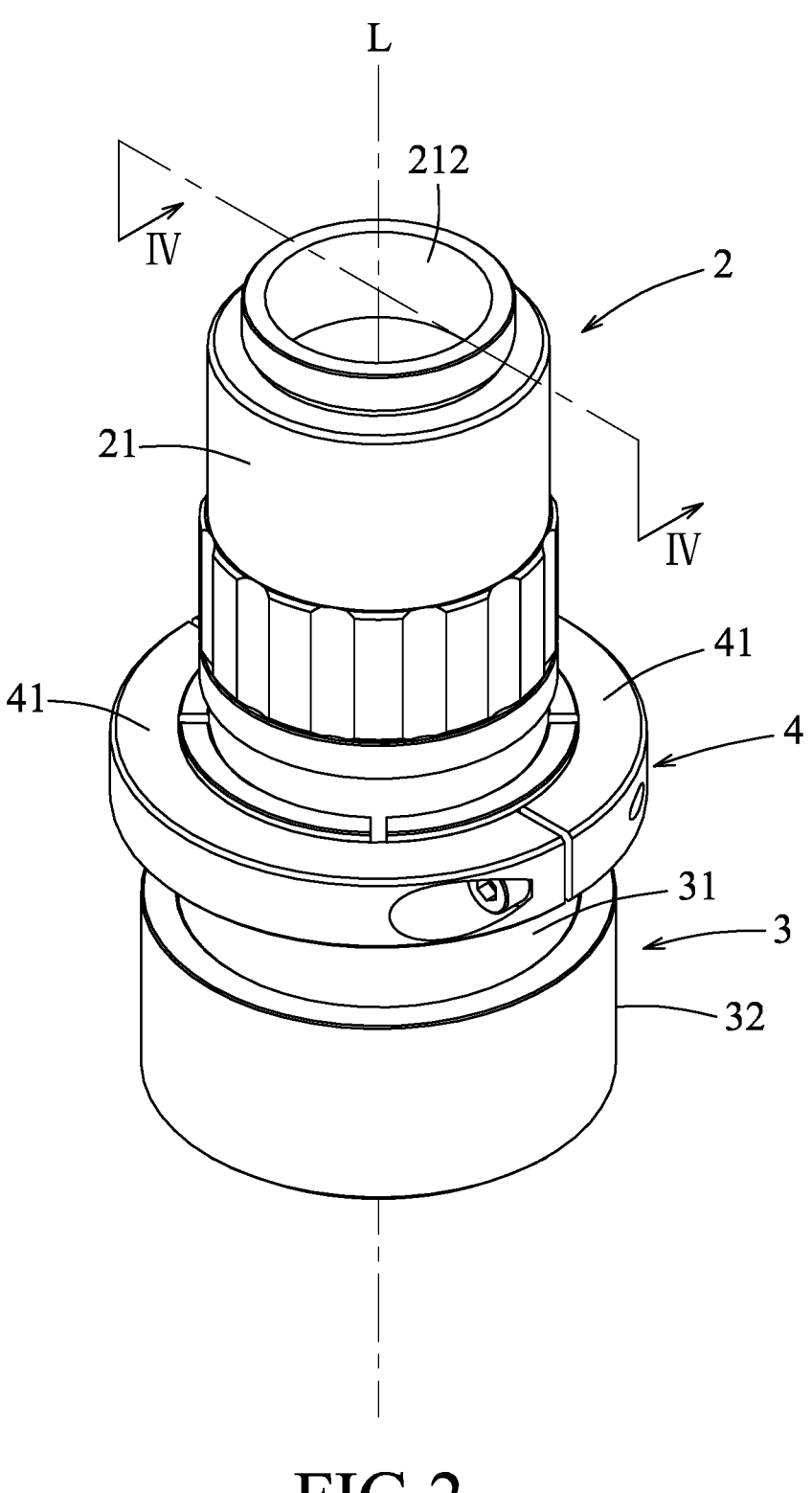
FIG. 2 is a perspective view of an embodiment of an optical lens assembly according to the disclosure.
Figure 3:
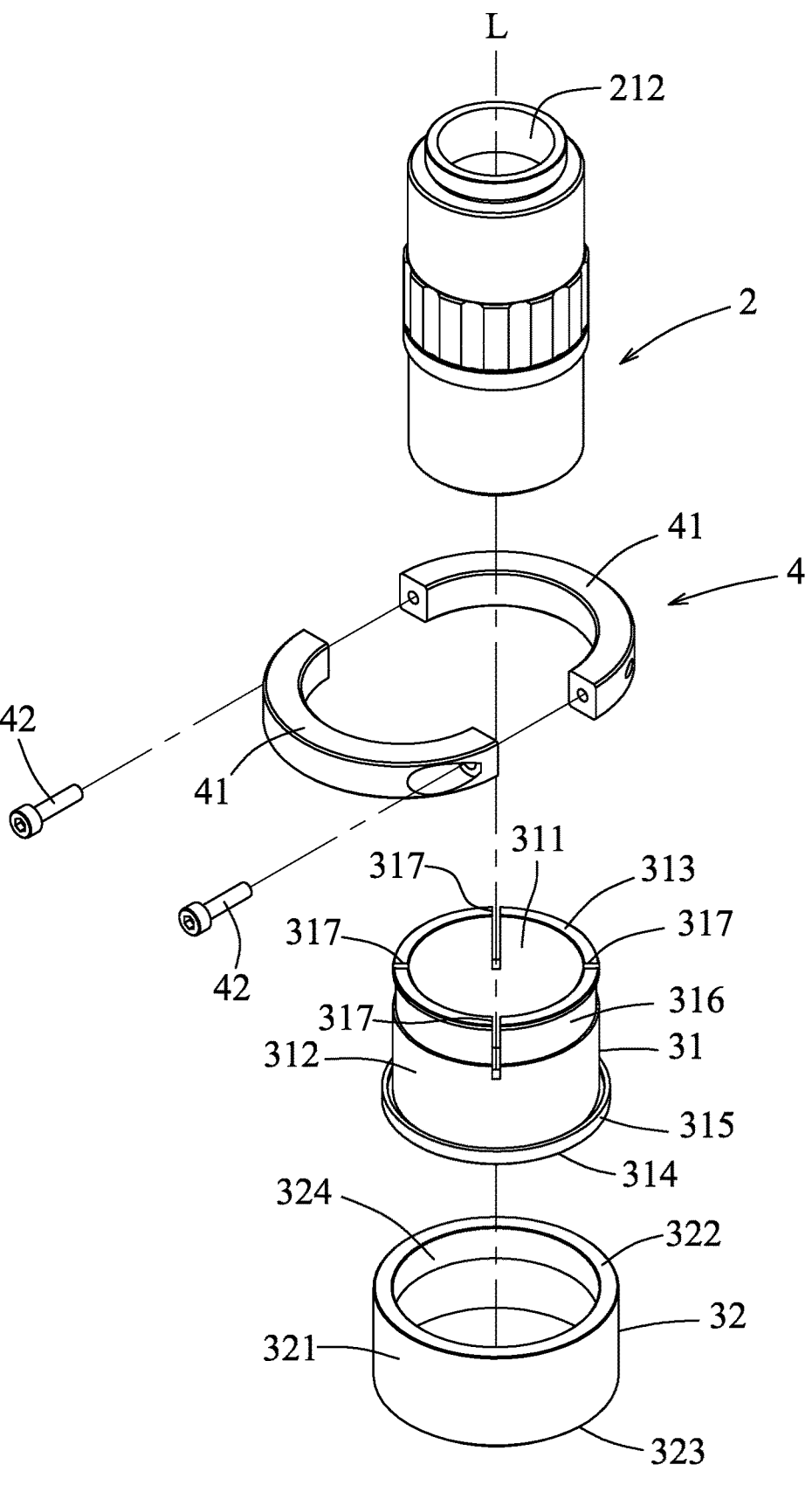
FIG. 3 is an exploded perspective view of the embodiment.
Figure 4:
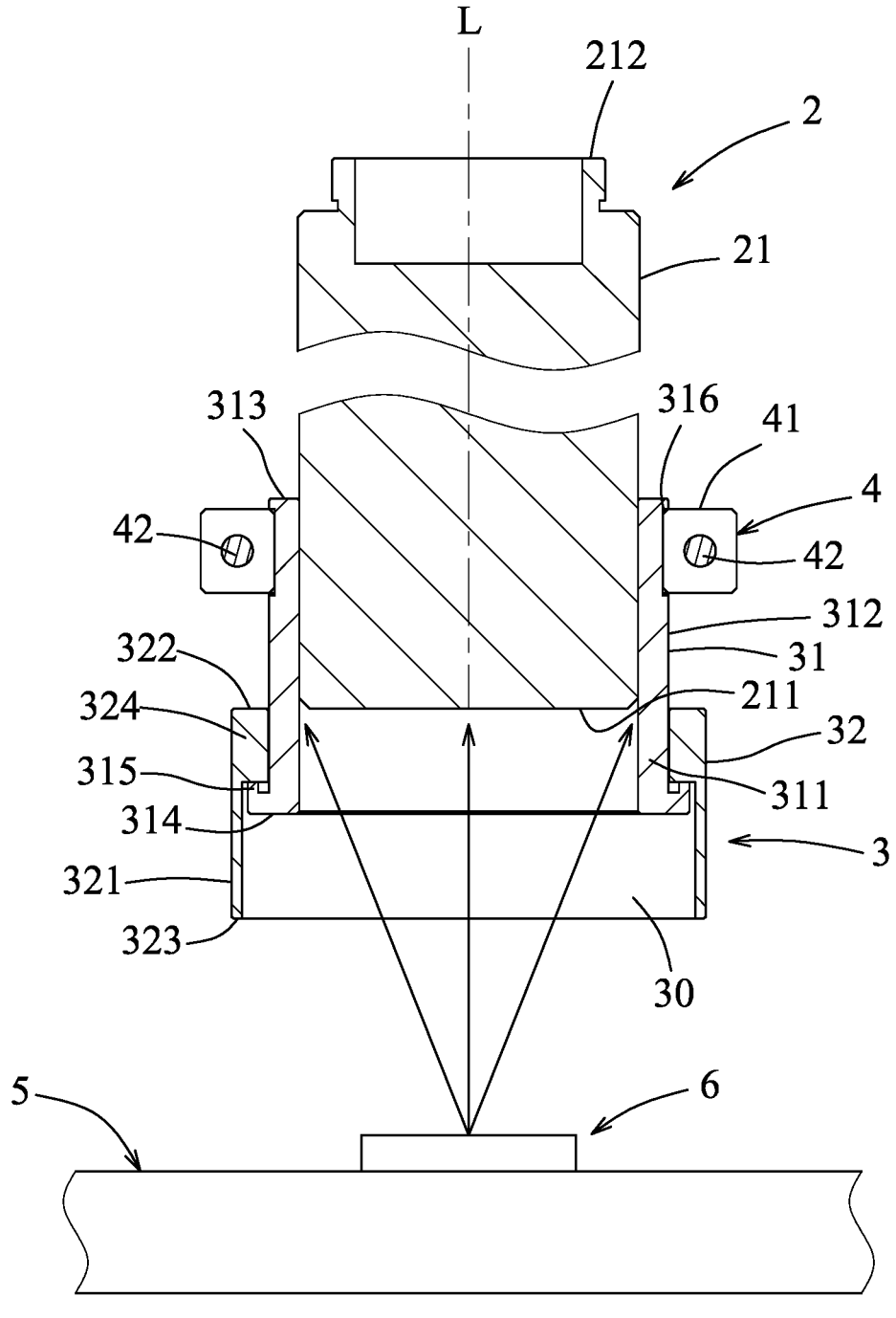
FIG. 4 is a fragmentary, sectional view taken along line IV-IV in FIG. 2 illustrating the embodiment being adopted in an optical measurement apparatus.

Referring to FIGS. 2 to 4, an embodiment of an optical lens assembly according to the disclosure is adapted for receiving a light beam that is emitted by an object 6 so that optical characteristics of the light beam can be measured. The object 6 is disposed on a measurement platform 5. The optical lens assembly includes a lens unit 2, a sleeve unit 3 and a fastening unit 4.

The lens unit 2 includes a casing 21. The casing 21 has a light-incident side 211 that is adapted for receiving the light beam, and a light-emergent aide 212 that is opposite to the light-incident side 211.

The sleeve unit 3 surrounds the light-incident side 211 of the casing 21, is removably mounted to the casing 21, and defines a light-receiving space 30 that is adapted for the light beam to pass through so that propagation of the light beam is unaffected by disturbance caused by movement of air. Specifically, in this embodiment, the sleeve unit 3 surrounds the light-incident side 211 and the light-receiving space 30 about an axis (L), and serves as a barrier between the light-receiving space 30 and the external environment, which reduces the probability of convection currents being generated in the light-receiving space 30 when there is a temperature difference in the external environment (e.g., a difference in temperature between the measurement platform 5 and the lens unit 2). Even if convection currents are generated in the external environment, the convection currents are prevented from entering the light receiving space 30 by the sleeve unit 3. Therefore, the optical path of the light beam generated by the object 6 is unaffected. In addition, when the optical lens assembly is in operation, the light-receiving space 30 is located. between the light-incident side 211 of the casing 21 and the object 6. Thus, the light beam emitted by the object 6 passes through the light-receiving space 30 first before being received by the light-incident side 211. Since the optical path of the light beam emitted by the object 6 is unaffected, the optical path of the light beam that is received by the light-incident side 211 remains the same in each aspect of optical measurements of the light beam, which improves measurement accuracy and repeatability.

The sleeve unit 3 includes a first sleeve 31 and a second sleeve 32. The first sleeve 31 surrounds the casing 21 about the axis (L). The second sleeve 32 is connected to the first sleeve 31.

The first sleeve 31 has a sleeve wall 311, an outer surface 312, a first end surface 313, a second end surface 314, an outer flange portion 315, an annular groove 316 and four slots 317. The first end surface 313 is adjacent to the lens unit 2. The second end surface 314 is opposite to the first end surface 313 in a direction of the axis (L). The outer flange portion 315 is located at an end of the first sleeve 31 distal from the casing 21. Specifically, the outer flange portion 315 is adjacent to the second end surface 314, and protrudes radially outwardly about the axis (L) from the outer surface 312. The annular groove 316 is adjacent to the first end surface 313, and is indented radially inwardly about the axis (L) from the outer surface 312. Each of the slots 317 is formed in the sleeve wall 311, is formed through the first end surface 313, extends from the first end surface 313 toward the second end surface 314, and communicates with the annular groove 316.

The second sleeve 32 surrounds the first sleeve 31, and is movable relative to the first sleeve 31 so that a length of the sleeve unit 3 is adjustable. The second sleeve 32 has a sleeve wall 321, a first end surface 322, a second end surface 323 apposite to the first end surface 321 in the direction of the axis (L), and an inner flange portion 324. The inner flange portion 324 is located at an end of the second sleeve 32 proximate to the casing 21. Specifically, the inner flange 322 of the second sleeve 32, and protrudes radially inwardly about the axis (L) from an inner surface of the sleeve wall 321. An outer diameter of the outer flange portion 315 of the first sleeve 31 is smaller than an inner diameter of the sleeve wall 321 of the second sleeve 32, and is greater than an inner diameter of the inner flange portion 324 of the second sleeve 32. The inner diameter of the inner flange portion 324 corresponds to an outer diameter of the sleeve wall 311. By virtue of the inner diameter of the inner flange portion 324 corresponding to the outer diameter of the sleeve wall 311, the inner flange portion 324 is movable along the sleeve wall 311 in the direction of the axis (L) so that the length of the sleeve unit 3 is adjustable. By virtue of the inner diameter of the inner flange portion 324 being smaller than the outer diameter of the outer flange portion 315 of the first sleeve 31, when the length of the sleeve unit 3 is adjusted to a maximum length, the outer flange portion 315 and the inner flange portion 324 abut against each other, and the second sleeve 32 is kept from being separated from the first sleeve 31. In this embodiment, the length of the sleeve unit 3 is defined as a distance between the first end surface 313 of the first sleeve 31 and the second end surface 323 of the second sleeve 32. In this embodiment, the length of the sleeve unit 3 ranges from 5 to 50 millimeters.

Referring to FIG. 4 again, when the outer flange portion 315 and the inner flange portion 324 abut against each other, the second end surface 323 of the second sleeve 32 is at a farthest position from the first end surface 313 of the first sleeve 31. At this time, the length of the sleeve unit 3 is at the maximum length.

Figure 5:
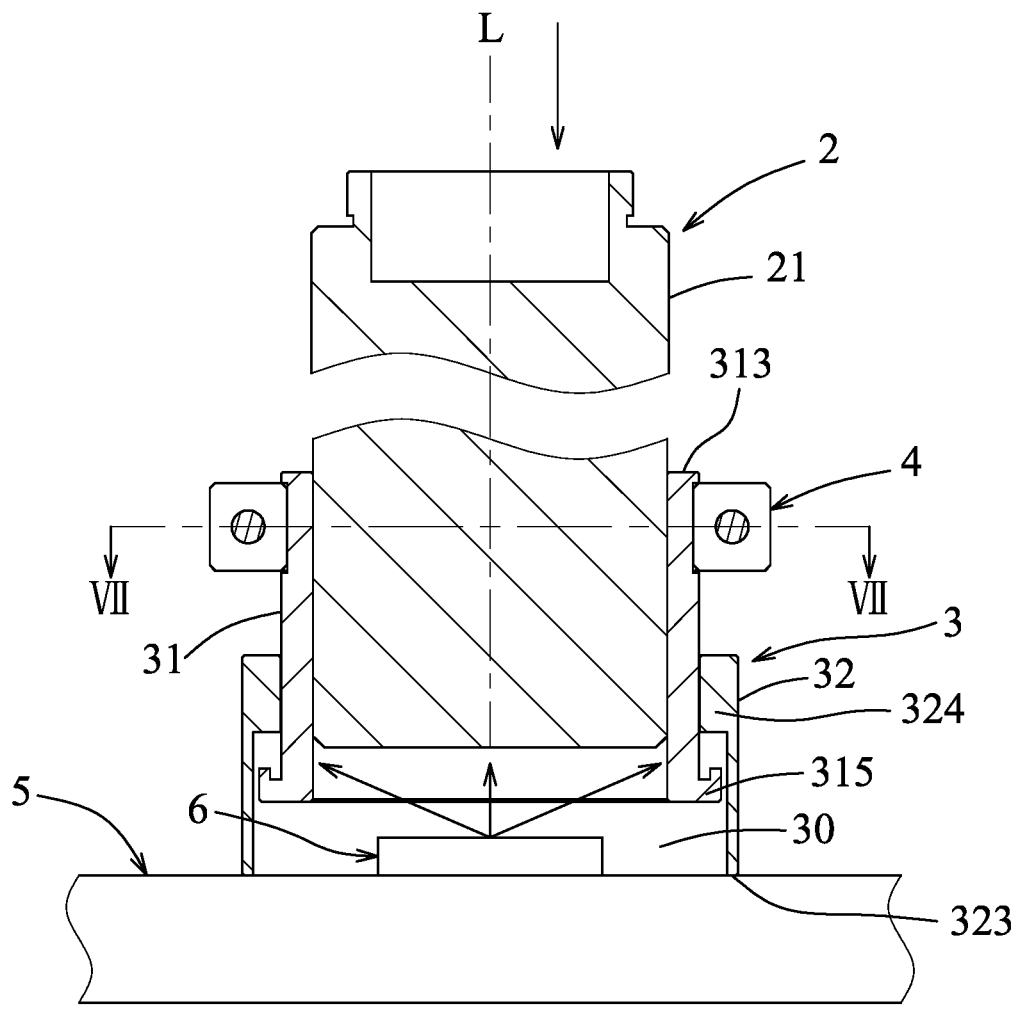
FIG. 5 is a view similar to FIG. 4, but illustrating a second sleeve of the embodiment abutting against a measurement platform.

Further referring to FIG. 5, when the second end surface 323 of the second sleeve 32 abuts against the measurement platform 5, a user may operate the sleeve unit 3 to urge the first sleeve 31 to move toward the measurement platform 5. As the first sleeve 31 moves toward the measurement platform 5, the inner flange portion 324 of the second sleeve 32 is separated from the outer flange portion 315 of the first sleeve 31 and moves increasingly closer to the first end surface 313 of the first sleeve 31. As a result, the first sleeve 31 is retracted into the second sleeve 32, so the length of the sleeve unit 3 is shortened. Afterwards, when the user operates the sleeve unit 3 to urge the inner flange portion 324 of the second sleeve 32 to move away from the first end surface 313 of the first sleeve 31, the length of the sleeve unit 3 will increase. That is to say, the length of the sleeve unit 3 is adjustable depending on the needs of the user.

n one optical measurement apparatus that includes the optical lens assembly and the measurement platform 5, the measurement platform 5 is capable of spot metering, carrying the object 6, energizing the object 6, and heating/cooling the object 6. When an optical measurement is conducted, the lens unit 2 is operable to move in the direction of the axis (L) so that the user can find an optimal position (e.g., a beam waist of the light beam emitted by the object 6) for image formation. In this embodiment, the direction of the axis (L) is parallel to an up-down direction. When the lens unit 2 needs to be closer to the object 6, the user may operate the sleeve unit 3 to urge the second end surface 323 of the second sleeve 32 to abut against the measurement platform 5 so that the length of the sleeve unit 3 is shortened along with a movement of the lens unit 2 toward the object 6. When the lens unit 2 needs to be farther away from the object 6, the user may urge the lens unit 2 to move upwardly. By virtue of the sleeve unit 3 being mounted to the casing 21, the first sleeve 31 can move upwardly with the lens unit 2. By virtue of the second sleeve 32 being movable relative to the first sleeve 31, when the first sleeve 31 moves upwardly, the second sleeve 32 will be stationary because of gravity until the outer flange portion 315 of the first sleeve 31 abuts against the inner flange portion 324 of the second sleeve 32. Via the upward movement of the first sleeve 31, the length of the sleeve unit 3 increases. Therefore, by virtue of the length of the sleeve unit 3 being adjustable, the distance between the lens unit 2 and the object 6 becomes adjustable, which enables the user to find the optimal position for image formation, and which ensures that the light beam emitted by the object 6 travels into the light-receiving space 30. Specifically, in order to keep the light beam traveling in the light-receiving space 30 and to protect the light beam against disturbance caused by the movement of air, the distance between the second end surface 323 of the second sleeve 32 and the measurement platform 5 should not be large, for example, be less than 30 millimeters.

Figure 6:
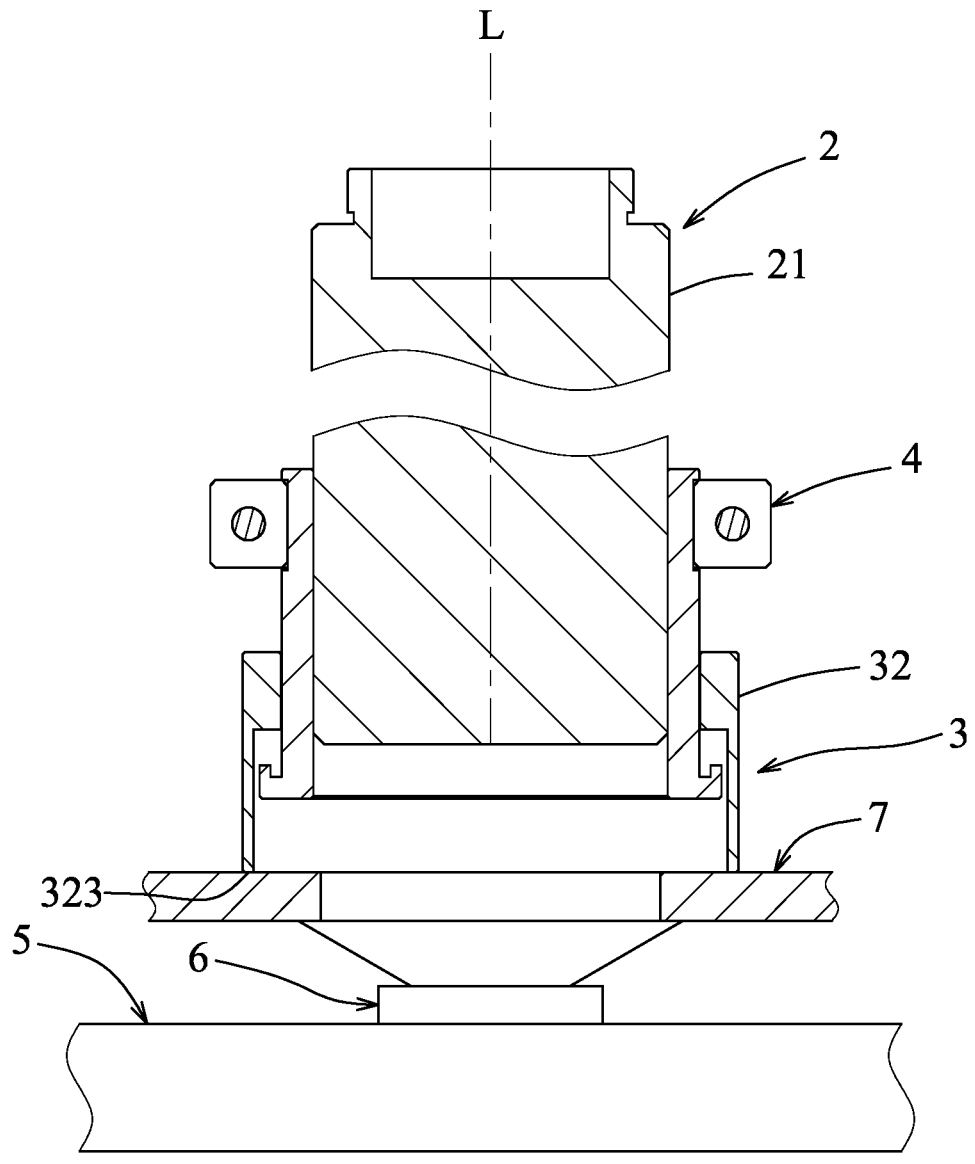
FIG. 6 is a view similar to FIG. 5, but illustrating the embodiment being adopted in another optical measurement apparatus.

Further referring to FIG. 6, the optical lens assembly may be adopted n another optical measurement apparatus that further includes an electrical testing unit 7 (e.g., a probe card). In this optical measurement apparatus, the measurement platform 5 is capable of spot metering, and the electrical testing unit 7 is capable of carrying the object 6, energizing the object 6, and heating/cooling the object 6. In addition, when the lens unit 2 needs to be closer to the object 6, the second end surface 323 of the second sleeve 32 is urged to abut against the electrical testing unit 7 instead of the measurement platform 5, and the first sleeve 31 is moved toward the electrical testing unit 7 so that the length of the sleeve unit 3 is shortened.

Figure 7:
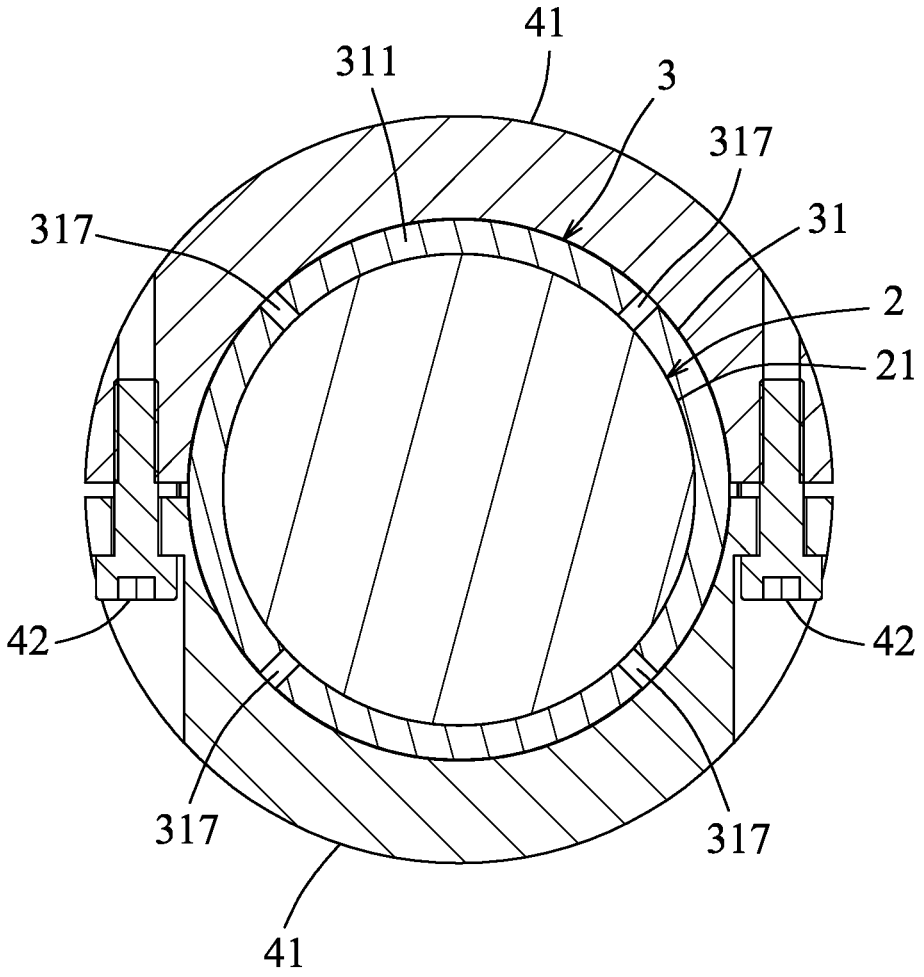
FIG. 7 is a sectional view taken along line VII-VII in FIG. 5.

Further referring to FIG. 7, in cooperation with FIGS. 3 and 4, the fastening unit 4 surrounds the sleeve unit 3 and is operable to tighten the sleeve unit 3 so that the sleeve unit 3 is removably mounted to the casing 21.

The fastening unit 4 includes two fastening members 41 and two securing members 42. Each of the fastening members 41 is arc-shaped. The fastening members 41 cooperatively surround the first sleeve 31. The securing members 42 are interconnected to the fastening members 41, and cooperate with the fastening members 41 to tighten the first sleeve 31 so that the sleeve wall 311 of the first sleeve 31 is mounted to the casing 21. Specifically, the fastening members 41 surround the annular groove 316 and the slots 317 of the first sleeve 31, and are mounted to the annular groove 316. By virtue of the slots 317 being formed in the sleeve wall 311 of the first sleeve 31 and communicating with the annular groove 316, and by virtue of the fastening members 41 surrounding and being mounted to the annular groove 316, an inner diameter of a portion of the first sleeve 31 where the annular groove 316 is formed is adjustable when the fastening members 41 and the securing members 42 are tightened. Thus, the first sleeve 31 can be securely mounted to the casing 21. Since the fastening members 41 surrounds and is mounted to the annular groove 316, the fastening unit 4 keeps the second sleeve 32 from being separated from the first sleeve 31 when the inner flange portion 324 of the second sleeve 32 is moved to the annular groove 316. Therefore, the inner flange portion 324 of the second sleeve 32 is movable along the sleeve wall 311 between the annular groove 316 and the outer flange portion 315.

Moreover, when the fastening members 41 and the securing members 42 are loosened, the sleeve unit 3 can be removed from the casing 21. Therefore, the user may replace the sleeve unit 3 with another sleeve unit that has a different inner diameter and a different range of length depending on the optical characteristics of the light beam emitted by the object 6 or different testing environments. By virtue of the inner diameter of the inner flange portion 324 corresponding to the outer diameter of the sleeve wall 311, the inner flange portion 324 is movable along the sleeve wall 311 in the direction of the axis (L) so that the length of the sleeve unit 3 is adjustable.

It should be noted that, in this embodiment, the first sleeve has four slots 317 that are equiangularly formed in the sleeve wall 311 thereof. However, in certain embodiments, the number of the slot (s) 317 that the first sleeve 31 has may not be four.

An embodiment of an optical measurement method according to the disclosure includes steps 101 and 102. In step 101, an object 6, a lens unit 2 and a sleeve unit 3 are provided. The object 6 is for emitting a light beam. The lens unit 2 includes a casing 21. The sleeve unit 3 surrounds the casing 21 and defines a light-receiving space 30. Specifically, in this embodiment, the sleeve unit 3 is mounted to the lens unit 2 by the aforesaid fastening unit 4. In step 102, the lens unit 2 operated so that the light beam emitted by the object 6 passes through the light receiving space 30 first and is then received by the lens unit 2. The light receiving space 30 protects propagation of the light beam therein against disturbance caused by movement of air.

Moreover, the embodiment of the optical measurement method further includes a step 103 in which the object 6 is heated or cooled. Specifically, the object 6 is heated or cooled by the aforesaid measurement platform 5, or by the aforesaid electrical testing unit 7 so that tests, such as a temperature cycling test, a thermal shock test, a high-temperature storage test and a low-temperature storage test, can be performed on the object 6 to analyze the optical characteristics of the light beam emitted by the object 6. That is to say, the object 6 is heated or cooled depending on different tests.

By virtue of the sleeve unit 3, the optical path of the light beam emitted by the object 6 will not deviate (the light beam will not be deflected due to the movement of air) when the object 6 is in the heating/cooling process.

In summary, in the optical lens assembly and the optical measurement method, the sleeve unit 3 prevents convection currents in the external environment from entering the light-receiving space 30, which keeps the temperature of the air in the light-receiving space 30 consistent during these tests so that convection currents are prevented from being generated in the light-receiving space 3. Therefore, the refractive index of the air will not fluctuate and the light beam will not be deflected due to the convection currents. The purpose of the disclosure, which is to improve the measurement repeatability and accuracy, is thus achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understand ng of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical lens assembly adapted for receiving a light beam that is emitted by an object, said optical lens assembly comprising:

a lens unit including a casing that has a light-incident side adapted for receiving the light beam;

a sleeve unit surrounding said light-incident side of said casing, and defining a light-receiving space that is adapted for the light beam to pass through so that propagation of the light beam is unaffected by disturbance caused by movement of air, wherein said sleeve unit includes a first sleeve that surrounds said casing, and a second sleeve that is connected to said first sleeve, and that is movable relative to said first sleeve so that a length of said sleeve unit is adjustable, wherein said sleeve unit is removably mounted to said casing of said lens unit; and a fastening unit surrounding said sleeve unit and operable to tighten said sleeve unit so that said sleeve unit is removably mounted to said casing.

2. The optical lens assembly as claimed in claim 1, wherein the length of said sleeve unit ranges from 5 to 50 millimeters.

3. The optical lens assembly as claimed in claim 1, wherein:

said first sleeve has an outer flange portion that is located at an end of said first sleeve distal from said casing;

said second sleeve has an inner flange portion that is located at an end of said second sleeve proximate to said casing; and when the length of said sleeve unit is adjusted to a maximum length, said outer flange portion and said inner flange portion abut against each other.

4. The optical lens assembly as claimed in claim 1, wherein said fastening unit includes:

two fastening members that cooperatively surround said first sleeve; and two securing members that are interconnected to said fastening members, and that cooperate with said fastening members to tighten said first sleeve so that said first sleeve is mounted to said casing.

5. The optical lens assembly as claimed in claim 1, wherein said first sleeve of said sleeve unit has an annular groove that is indented from an outer surface thereof, said fastening unit being mounted to said annular groove.

6. The optical lens assembly as claimed in claim 1, wherein said first sleeve of said sleeve unit has at least one slot, said fastening unit surrounding said at least one slot such that an inner diameter of a portion of said first sleeve that is surrounded by said fastening unit is adjustable.

7. An optical measurement method comprising steps of:

a) providing an object that is for emitting a light beam, a fastening unit, a lens unit that includes a casing, which has a light-incident side, and a sleeve unit that surrounds said light-incident side of said casing, that defines a light-receiving space, that includes a first sleeve which surrounds said casing, and a second sleeve which is connected to said first sleeve, and which is movable relative to said first sleeve, a length of said sleeve unit being adjustable, said fastening unit surrounding said sleeve unit and being operable to tighten said sleeve unit so that said sleeve unit is removably mounted to said casing; and b) operating said lens unit so that the light beam emitted by said object passes through said light-receiving space and is received by said light-incident side of said lens unit, said light receiving space protecting propagation of the light beam therein against disturbance caused by movement of air.

\* \* \* \* \*